May 19, 1970   C. A. SHERMAN   3,513,321
LOG TALLY SYSTEM WITH MINIMUM DIAMETER MEASURING MEANS
Filed Aug. 3, 1967   2 Sheets-Sheet 1
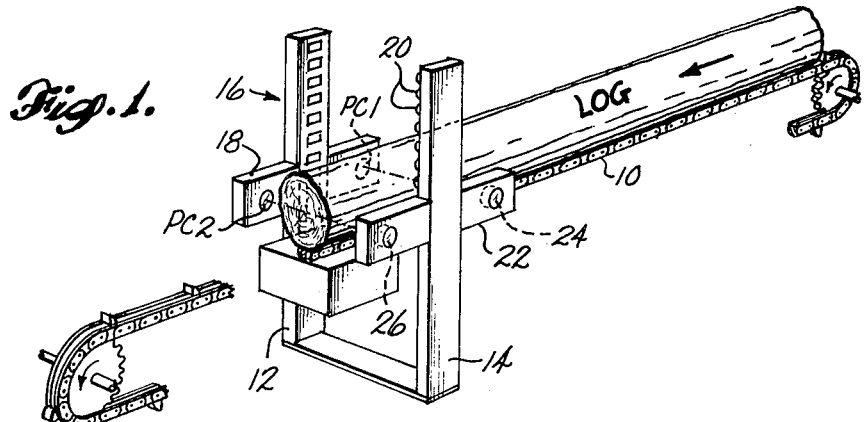
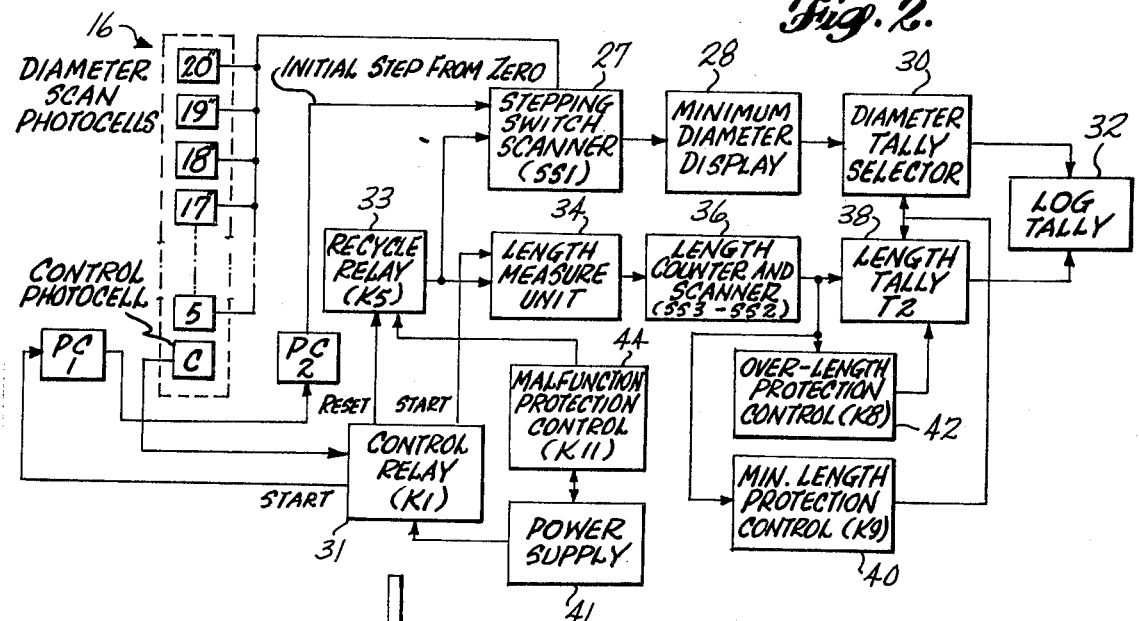
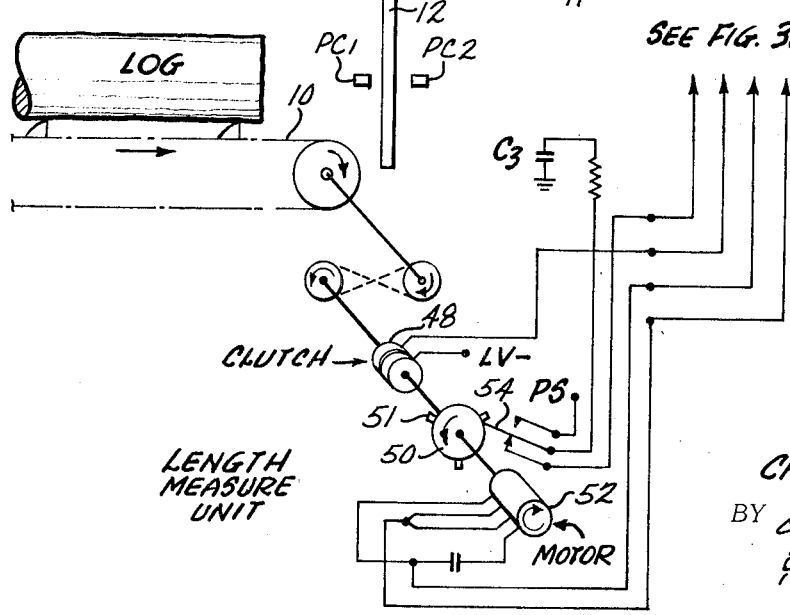
INVENTOR.
CHARLES A. SHERMAN
BY Christensen, Sanborn
& Matthews
ATTORNEYS

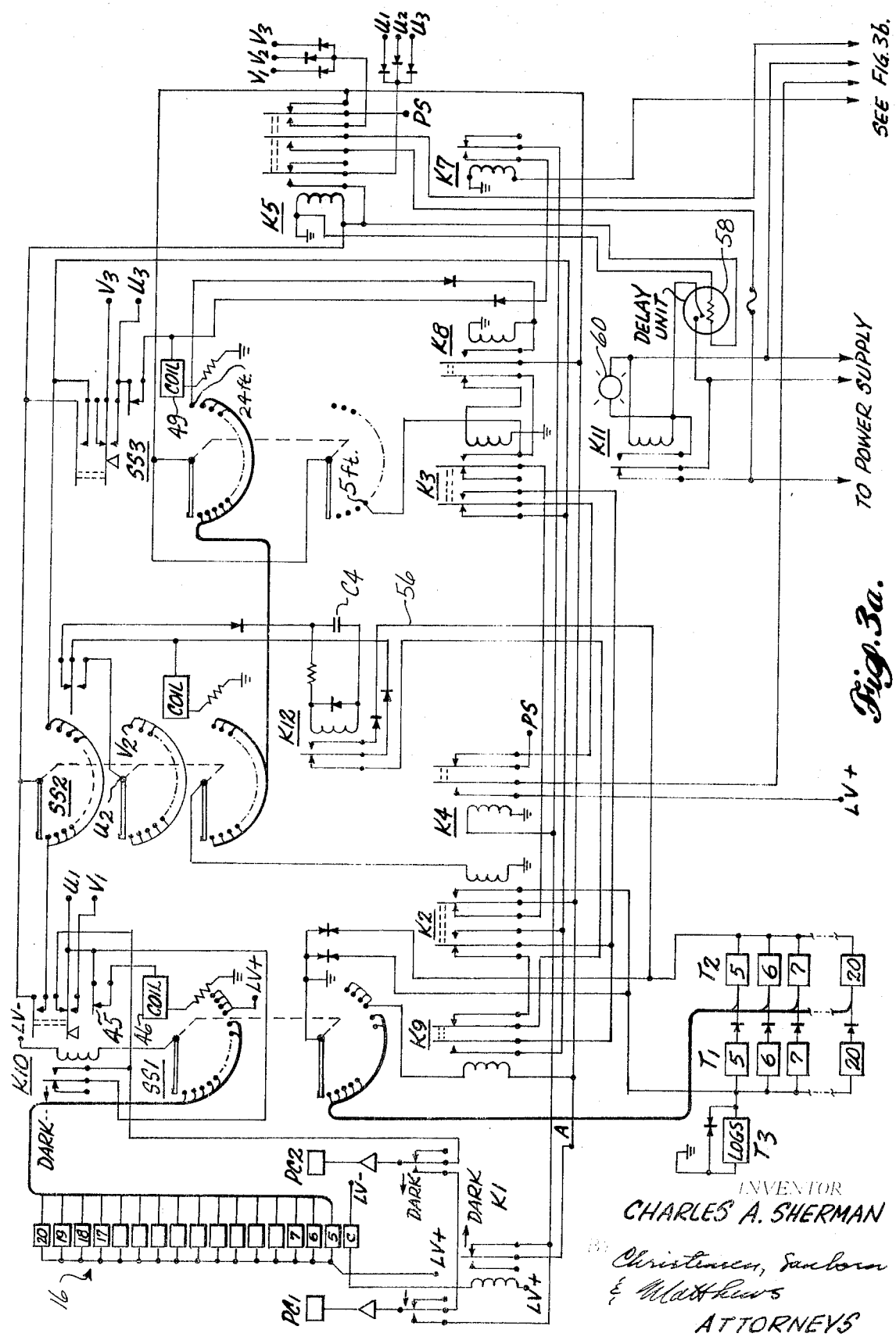

United States Patent Office 3,513,321
Patented May 19, 1970

3,513,321
LOG TALLY SYSTEM WITH MINIMUM
DIAMETER MEASURING MEANS
Charles A. Sherman, Tacoma, Wash., ssignor to Weyerhaeuser Company, Tacoma, Wash., a Washington company
Filed Aug. 3, 1967, Ser. No. 658,130
Int. Cl. G01n 21/30
U.S. Cl. 250—219                                    14 Claims

ABSTRACT OF THE DISCLOSURE

This application discloses an improved and simplified log tally unit particularly well suited for use in a small log mill wherein the minimum diameter and total length of each log must be known. Once the minimum diameter and length of a log are known, the number of usable board feet in the log can be easily calculated, and the saw blades in the framesaw can be spaced in accordance with the minimum diameter information in order to obtain the maximum lumber yield from the log. In the illustrated system a bank of photocells are located adjacent the path of travel of a log in the system with associated light sources being disposed on the opposite side of the log. As the log travels lengthwise between the photocells and light sources it will interfere with the passage of light to the photocells in a manner such that the number of darkened cells will be proportional to the diameter of the log. A self-actuated stepping switch coupled with the photocell bank serves to scan the photocells starting with the cell corresponding to the maximum diameter of any log to be measured. The scanner switch continues in its sampling of the photocells until a darkened cell is reached. It then remains in that stepped condition until such time as the observed diameter of the moving log decreases to cause the then darkened cell to receive light from its associated source. When this occurs the stepping switch automatically continues its scan of the photocells until a darkened cell is again reached. The setting of the stepping switch after the log has completed its traverse of the photocell bank then provides an indication of the minimum diameter of the log. The system further includes a length-measuring unit as well as various protective control arrangements.

BACKGROUND OF THE INVENTION

This invention relates to systems for automatically determining the amount of lumber in logs being processed in a mill. In particular, it relates to an improved and simplified log measuring system adapted to determine the minimum diameter of a log for the setting of framesaws, as well as to determine its length in order to provide information as to the available number of board feet obtainable from the log and to total such information for a large number of logs. While the invention is herein described in terms of a particular preferred form thereof, various possible modifications therein within the scope of the principles involved will be recognized by those skilled in the art.

In the operation of a small log mill it would be advantageous to have a low-cost tally unit having the capability of scanning each log to determine the minimum diameter and total length thereof. While complicated and relatively expensive equipment has been developed in the past for accomplishing such functions, it is found in practice that unless one is dealing with a large log mill the expense associated with such sophisticated equipment does not warrant the procurement thereof. However, the need to know the minimum diameter and length of a log for determining the proper setting of the framesaws is as important in a small log mill as in a large one.

Accordingly, it is an object of the present invention to provide a simplified and low-cost log tally unit having the capability of accurately determining the minimum diameter of a log as well as its length.

Another object of this invention is to provide a simplified photocell scanning system arranged adjacent to the path of travel of a log and having the capability of automatically determining the minimum diameter of a log passing the photocell unit.

A further object is to provide a stepping switch and relay operated log mill tally system for providing output signals representative of the minimum diameter and length of a log and thereby permit the accurate calculation of usable material in each log.

An additional object of the invention is to provide a continuous diameter-monitoring system for monitoring the minimum diameter of logs passing through the system and presenting information as to length and number of logs classified as to the minimum diameters thereof.

SUMMARY

In accordance with the teachings of this invention a system is provided for determining the minimum diameter of logs in a mill. The system comprises sensing means located adjacent to the position of a log at a point along its length and including a plurality of electrical devices each corresponding to a different discrete log diameter and capable of first and second electrical states. Actuating means sensitive to the log diameter at the sensing location are coupled to effect a change in state of a number of said devices corresponding to the log diameter at that location. Means such as a conveyor effects relative movement between the log and the sensing means lengthwise of the log, while during such movement means coupled to scan the electrical devices determines that number of electrical devices having electrical states corresponding to the minimum log diameter during traverse of the sensing means along the length of the log. Finally, a display or recording means coupled to the scanning means records the minimum diameter information provided thereby for each log measured.

In its preferred form the sensing means comprises a plurality of photocells arranged adjacent to the path of lengthwise travel of logs moving through the system, with associated light sources being disposed on the opposite side of the logs and directed toward the photocells. The logs move on an appropriate conveyor system with the photocells being arranged perpendicular to the surface carrying the logs and spaced in accordance with any selected distance such as one inch apart. As the log passes between the bank of photocells and the light sources associated therewith a number of photocells will be darkened as a result of the log being disposed in the path of the light. By knowing the vertical separation between the photocells it will be seen that the highest photocell which is darkened indicates the diameter of the log for a given position thereof.

Thus the system includes a self-stepping relay coupled to the photocell bank and operative to start scanning the photocells in response to a command signal from another pair of photocells displaced one from the other in a direction parallel to the path of travel of the log. When the latter two photocells are both darkened, the stepping switch starts sampling the vertical banks of photocells beginning with the highest photocell and working downwardly. When a darkened photocell is reached the self-interrupting contacts of the stepping relay are no longer activated and the stepping relay then remains at a setting corresponding to the first darkened photocell reached in the scanning operation.

As the log continues in its travel, it is not uncommon for the diameter thereof to increase momentarily due to some irregularity of the log. However, the stepping switch does not respond to such an increase in diameter as compared to the diameter first determined by the reaching of the lowest darkened cell. On the other hand, if during the travel of the log the diameter thereof decreases, then the darkened cell which previously caused the stepping switch to stop will become lighted, and hence the stepping switch will continue its scanning operation to reach the lowest darkened photocell. This operation is continued along the length of the log so that when the log has passed the scanning system the setting of the stepping switch will be a direct indication of the minimum diameter of that log, except that an additional set of photocells spaced along the length of the log on either side of the vertical bank of photocells prevent diameter measurements near the ends to avoid errors due to angled or "butt-cut" logs.

As a given log completes its travel past the photocell and scanning system, reset signals are delivered to the stepping switches in the system causing them to return to their initial positions in preparation for measuring the diameter of the next log.

The system includes a length determining circuit coupled with the log haul conveyor and operative to provide an electrical pulse for each unit of log travel passing through the diameter photocell scanning unit.

Electromechanical counters coupled with the diameter scanning unit and the length measuring unit serve to provide output signals directly indicative of the minimum diameter and total length of each log. These signals are then utilized in a simple computing circuit for determining the usable material in each log.

The above as well as additional features, objects and advantages of the invention will be more clearly understood from the following description when read with reference to the accompanying drawings.

BRIEF DESCRIPTION OF THE DRAWINGS

FIG. 1 is a somewhat diagrammatic isometric view of a log haul conveyor carrying a log lengthwise between a bank of photocells and their associated light sources arranged in accordance with the invention for determining the minimum diameter and length of the log.

FIG. 2 is a generalized system block diagram illustrating the overall operation of the invention.

FIGS. 3a and 3b are diagrams of the monitoring and computing circuit and the length measuring unit, respectively, in accordance with the invention.

DETAILED DESCRIPTION OF THE PREFERRED EMBODIMENT

The preferred embodiment of the invention is shown somewhat schematically in FIG. 1 as it would be installed in association with a log haul conveyor 10 in a small log mill. The conveyor 10 carries the log lengthwise between upright supports 12 and 14 spaced on opposite sides of the log and extending transversely to its direction of travel. Upright support 12 carries the plurality of diameter scan photocells 16 and the crossarm 18 supported thereon carries first and second control photocells PC1 and PC2. Upright 14 supports a plurality of light sources 20 associated with and directed toward photocells 16 and a crossarm 22 holds first and second light sources 24 and 26 directed toward control photocells PC1 and PC2. As the log is carried between the photocells and their respective light sources it first darkens photocell PC1, then a number of the diameter scan photocells 16, and finally control photocell PC2. These photocells are connected in accordance with the invention in the monitoring and tallying system shown in block diagram form in FIG. 2.

Included in the bank of diameter scan photocells 16 (FIG. 1) is a control photocell C shown in FIG. 2 which actuates control relay 31. When the log has passed photocells PC1 and PC2, control relay 31 completes a circuit to a stepping switch 27, which is arranged as a self-stepping counter moved an initial step from its home position by the voltage applied through photocells PC1 and PC2. In accordance with the invention, stepping switch counter 27, after application of this start signal, scans the diameter photocells beginning with the highest diameter 20 and continuing down until it finds the first photocell darkened by the presence of the log in the beam from the associated light source. This stops the scanner at a position representing the minimum diameter of the log.

As the log travels between the scanning photocells and their respective light sources, its diameter may increase or decrease from the initial reading taken by the stepping switch counter. However, the counter will not respond to an increase in diameter, i.e. it will not count backwards, but it will note a leser diameter along the length of the log, should additional photocells receive light and permit the counter to step one or more additional steps. The minimum diameter of the log, therefore, is indicated by the count finally reached by the stepping switch, and this reading is displayed in a minimum diameter display means 28 which preferably comprises another bank of the same stepping switch counter 27. This information is ultimately read into a minimum diameter tally selector 30 and finally totaled in a log tally unit 32 comprising the output of the system. Since the positions and spacing of the photocells are known, the reading represents a measurement in inches or other units.

In the meantime, control relay 31 also triggers a length measuring unit 34 which measures the number of feet of log length as the log travels through the system. This length information is transferred by a length measurement scanner 36 into a length tally unit 37, and is finally read into the same log tally unit 32 in which the minimum diameter reading is recorded.

A minimum length protection control 40 is included to prevent the count of a log of less than five feet in length, for example, and an overlength protection control 42 is included to prevent the count of a log over a given length, such as 24 feet. Signals from these protection controls can be used in the log haul system to reject under- or over-length logs. An additional protective control 44 is also included to detect malfunctions in the counting system, such as failure to recycle, and in that event prevents damage by shutting down the system.

The operation of the preferred embodiment thus briefly described will now be explained in greater detail in connection with the circuit diagram of FIGS. 3a and 3b. The log carried by log haul conveyor 10 first passes through the beam of photocell PC1, then through the beams of photocells in diameter scan photocell unit 16, and finally intersects the beam of photocell PC2. As control photocell C in the diameter scan unit is darkened, relay K1 is de-energized, connecting the positive power supply terminal A to relay K10 through photocells PC1 and then PC2, as soon as the latter is darkened. (Terminals marked LV+ and LV− represent low voltage connections in the power supply, not shown in FIG. 3a, while A and PS represent relatively higher voltage power supply connections.) The control photocells thus energize the normally closed self-stepping contact 45 of stepping switch SS1, causing energization of its actuating coil 46 and moving it one step off its home position. This connects its wiper to the first contact corresponding to maximum diameter photocell 20 and energizes the coil of relay K10. The self-stepping contacts of switch SS1 then continue stepping through a downward scan of the photocells until the first darkened one is reached, whereupon K10 is de-energized, breaking the stepping voltage applied to the coil of SS1. The scanner will remain in this position unless another photocell is lighted by the arrival of a smaller diameter portion of the log, whereupon it will automatically step one or more additional steps to the smaller diameter until the end of the log passes photocell PC1, breaking the supply of current to the stepping contacts and relay K10.

In the meantime, de-energization of relay K1 by darkening of control photocell C energizes relay K4, which supplies current to a clutch 48 in the length measure unit (FIG. 3b). This unit includes a switch-actuating cam wheel 50 driven in counterclockwise rotation by log haul conveyor 10 when clutch 48 is actuated, and driven in reverse rotation by the counter-rotation motor 52 when clutch unit 48 is released. The motor 52 returns the cam to its starting position after the log has passed in order to provide the same starting point for measurement of the next log.

The pins 51 on cam wheel 50 operate the contacts of a switch 54 to charge a capacitor C3 once for each foot of a log length passing the photocell scan unit 16. As the contact of switch 54 drops off each one of the pins 51, capacitor C3 is connected to the coil of relay K7 (FIG. 3a) causing it to close and supply a pulse to the stepping coil 49 of log length counter stepping switch SS3, stepping it one step. Log length counter SS3 continues to step for each pulse supplied by switch 54 as long as the cam wheel is rotated, and its final position represents the usable length of the log.

As the wiper of switch SS3 records five feet in length, it energizes the coil of minimum length protection control relay K3, through relay K8, closing the K3 contacts to the right. Relay K3 remains closed until its coil is de-energized by operation of relay K8 in the event of an overlength log as later explained, or by operation of relay K2 when the system is recycled. If the log length is less than five feet, K3 is never energized and prevents tally of the short log.

If the log length measurement exceeds twenty-four feet, the wiper of the switch SS3 energizes the coil of overlength protection control relay K8, causing recycling of the stepping switches in the system to their respective home positions without recording any diameter or length information. This prevents tallying of overlength logs, and such logs may be rejected automatically by suitable connections (not shown), for example, to relay K8.

When the trailing end of the log passes control photocell C, control relay K1 is re-energized, de-energized relay K4. This applies current through the closed contacts of relay K3 and the closed contacts of relays K2 and K9 to relay K12 and hence to the coil of self-stepping log length scanner switch SS2, causing it to begin stepping.

For each step of switch SS2 relay K12 is operated once (its speed being controlled by count speed control capacitor C4), applying a pulse through lead 56 to the footage totalizing counters T2. A number of pulses will be applied to these counters corresponding to the length of the log, since SS2 will stop counting when its wiper reaches an energized connection corresponding to the position of the wiper of switch SS3 representing the log length just tallied therein.

Each of the footage tally counters T2, numbered 5 to 20, represents a particular log diameter, and only one of these will have been actually preconditioned to receive length tally pulses by the position of the wiper of stepping switch SS1 representing the minimum diameter of the log. Thus the particular footage tally counter T2 energized by the minimum diameter reading receives a length footage reading from relay K12 so a to record the total footage for that particular diameter.

At the same time a corresponding one of the log tally counter T1 is energized by the minimum diameter setting of switch SS1, and a single pulse is recorded in that counter by operation of relay K2, as will be explained shortly, recording the number of logs tallied for the particular diameter. In addition, a total log tally counter T3 records the total number of logs of all diameters.

When the log length scanner SS2 completes its count of the number of log feet recorded in switch SS3 relay K2 is actuated, its coil being energized through the wipers of switches SS3 and SS2, which are connected to the power supply through relay K5. This breaks the supply of current to relay K12, stopping the count of switch SS2. This also completes a circuit through the normally open, off-normal contacts of switches SS1, SS2 and SS3 to the coil of relay K5 which, through connections of terminals $V_1$, $V_2$, $V_3$ and $U_1$, $U_2$, and $U_3$ supplies current to the stepping coils of these switches, returning them back to their home positions. Relay K5 is automatically held energized through its own contacts until all three stepping switches are returned to their home positions.

Simultaneously, relay K5 energized to full power the counter-rotation motor 52 in the length measure unit, returning cam wheel 50 to its home position prepared for measurement of the next log. Clutch unit 48 has been disengaged previously by deenergization of relay K4.

As a safety measure a delay unit 58 is included to disconnect the power supply through relay K11 and turn on a warning light 60, if the time required for resetting the various stepping switches exceeds five seconds, indicating a malfunction in the counting system. This prevents continued motoring and excessive wear of the stepping switches which might be caused by failure of any of the switches to return to its zero position.

Thus, a simple electromechanical counting circuit has been devised which provides output signals directly indicative of the minimum diameters of the logs measured, and totalizes the log footage for each minimum diameter, as well as the number of logs at each diameter and the total number of logs processed. The simple countdown arrangement of the minimum diameter scanning switch confers greater simplicity on the system than was heretofore possible in log tally systems and makes it economically feasible to supply an automatic minimum diameter tally and control circuit in small log mills for control of framing saws and for accounting purposes. Other advantages, as well as modifications of the disclosed system within the scope of the principles involved, will be recognized by those skilled in the art.

I claim as my invention:

1. A system for determining the minimum diameter of logs in a mill, comprising:
   (a) sensing means located adjacent to the position of a log at a point along its length and including:
      (1) a series of input devices each corresponding to a different discrete log diameter value and capable of transmitting a signal indicating that the log diameter at said point is less than said value, and
      (2) actuating means sensitive to the diameter of the log at said point and operable to cause said devices to transmit said signal in accordance therewith;

(b) means operable to effect relative movement between said sensing means and said log in a direction lengthwise of the log;

(c) means coupled to receive said signals and operable during said relative movement along the length of said log to respond to a reception of signals indicating reductions in log diameter, while remaining passive to signals indicating increases in log diameter; and (d) means for providing an output signal representative of the relative location in said series of the input device to which the signal receiving means last responds.

2. The system defined in claim 1 wherein said input devices comprise photocells arranged in a column adjacent to the position of said log and transverse to its length, and said actuating means comprises a series of light sources respectively associated with said photocells and disposed on the opposite side of said log directed toward the photocells.

3. The system defined in claim 1 wherein said means for effecting relative movement comprises a log haul conveyor carrying the log lengthwise past the position of said sensing means, said sensing means being mounted in stationary position with respect to said conveyor.

4. The system defined in claim 1 wherein said signal receiving means comprises a unidirectional self-stepping counter operable in response to presence of a log adjacent to said sensing means to respond sequentially to said input devices stepwise downwardly beginning with the device corresponding to the largest diameter value in said series, and means for stopping said counter at a position corresponding to the device lowest in said series transmitting said signal during said movement along the length of said log, whereby the final position of said counter represents the minimum diameter of the log as measured during said movement.

5. The system defined in claim 4 wherein said counter includes a plurality of output terminals corresponding to respectively different log diameter values and selectively energized in accordance with the final position of said counter representing the minimum diameter of said log, said system further including log length measuring means operable to provide a series of length unit pulses representing in number the length of said log, and tallying means comprising a plurality of length unit counters responsive to said length measuring means and corresponding respectively to said discrete log diameter values, said length unit counters being also responsive to the respective corresponding output terminals of the first-mentioned counter and selectively operable by energization thereof to receive said series of length unit pulses, whereby each length unit counter records total log length for each minimum log diameter.

6. The system defined in claim 5 wherein said length measuring means comprises means positioned adjacent to the position of said log and operable to generate initial pulses corresponding in number to the length of said log during said relative movement; storage means responsive to said initial pulse generating means and operable to store said initial pulses during said relative movement; and length unit pulse generating means coupled to said storage means, to said tallying means and to said sensing means for generating said series of length unit pulses corresponding in number to said initial pulses following said relative movement.

7. The system defined in claim 5 wherein said tally system further includes a plurality of log counters coupled to said length unit counters respectively and corresponding to said discrete log diameter values, said log counters being selectively activated by energization of the output terminals of said first-mentioned counter, and means responsive to said sensing means for supplying one pulse to the selectively activated log counter for each log of minimum diameter corresponding thereto.

8. A log tally system for determining the length and minimum diameter of logs in a mill, comprising a diameter scan unit including a plurality of photocells arranged in a column adjacent to the position of the log in the system and transverse to its length and light sources associated with said photocells and disposed on the opposite side of said log directed toward the photocells; means for effecting relative movement between the log and said diameter scan unit in a direction lengthwise of the log so as to darken a number of said photocells proportional to the minimum diameter of the log; means operable to scan said photocells to determine the minimum number of photocells darkened during traverse of the photocells along the length of the log; log length measuring means operable to provide a signal representative of the length of the log; and totaling means responsive to said scanning means and to said length measuring means and operable to total and display the minimum diameter and length information provided thereby for a plurality of logs.

9. The system defined in claim 8 wherein said means for effecting relative movement comprises a log haul conveyor carrying the log lengthwise between said photocells and their associated light sources, said photocells and light sources being mounted in stationary position with respect to said conveyor.

10. The system defined in claim 8 wherein said scanning means comprises a self-stepping switch, means coupled to said photocells for initiating stepping of said switch upon passage of the forward end of the log a predetermined distance beyond the photocells and their associated light sources, said switch being connected to scan said photocells beginning with the photocell associated with the maximum possible diameter measurement and continuing its scan toward lesser diameters, and means for stopping said switch at a final position associated with the darkened photocell coresponding to the minimum diameter observed by said photocells during passage of the log between said photocells and light sources.

11. The system defined in claim 10 wherein said totaling means comprises a plurality of counters operable to be conditioned individually by different final positions of said switch corresponding, respectively, to the minimum diameters associated with said photocells, said length measuring means including means for supplying to the preconditioned one of said counters a number of pulses corresponding to the length of the log, whereby said counters display the total length of successively measured logs for said minimum diameters, respectively.

12. A system for determining the minimum diameter of a log in a mill, comprising:
(a) sensing means located adjacent to the position of said log at a point along its length and including a series of electrical input means each sensitive to a different discrete log diameter value and operable to transmit first and second signals indicating, respectively, that the log diameter at said point does or does not exceed the value to which such input means corresponds,
(b) means operable to effect relative movement between said sensing means and said log in a direction lengthwise of the log;
(c) signal receiving means coupled to said electrical input means and operable during said relative movement to respond to said second signals and not to said first signals; and
(d) recording means responsive to said signal receiving means for indicating the log diameter value of the input means to which said signal receiving means last responds during said relative movement along the length of said log.

13. The system defined in claim 12 wherein said signal receiving means comprises a unidirectional self-stepping counter, means operative during relative movement along the length of said log to cause said counter to advance one count for each of said input means transmitting a second signal, beginning with the input means corresponding to the greatest log diameter value, whereby the position of said counter represents the minimum diameter of the log along its length, said recording means being responsive to the position of said counter.

14. The system defined in claim 12 wherein said input means comprises:
   (a) a series of photocells arranged in a column adjacent to the position of said log and transverse to its length at said point, and
   (b) a series of light sources respectively associated with and directed toward said photocells to energize the same to provide second signals, said photocells being positioned on the opposite side of said log whereby said log interrupts energization of said photocells to provide said first signals.

References Cited

UNITED STATES PATENTS

| | | |
|---|---|---|
| 3,428,817 | 2/1969 | Hofmeister et al. |
| 2,351,337 | 6/1944 | Houston _____ 356—167 |
| 2,828,917 | 4/1958 | Wheeler et al. |
| 3,304,425 | 2/1967 | Astheiner _____ 250—208 X |
| 3,312,140 | 4/1967 | Dokoupil _____ 350—96 X |

FOREIGN PATENTS

| | | |
|---|---|---|
| 131,882 | 10/1960 | Russia. |
| 1,086,450 | 10/1967 | Sweden. |

RALPH G. NILSON, Primary Examiner

C. M. LEEDOM, Assistant Examiner

U.S. Cl. X.R.

144—2, 312; 209—111.7; 250—209; 356—160